Patented Nov. 11, 1924.

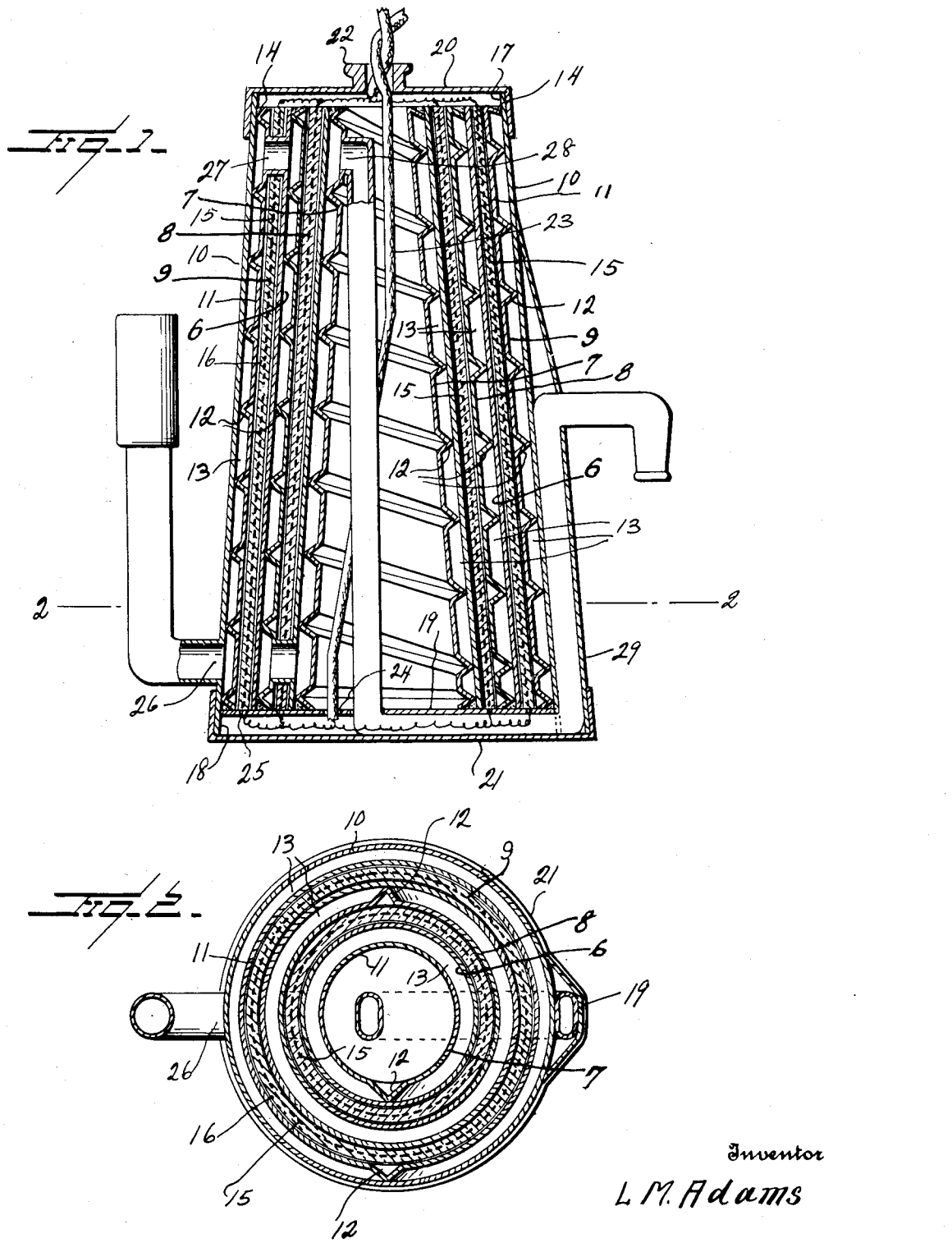

1,514,813

UNITED STATES PATENT OFFICE.

LESLIE M. ADAMS, OF SEATTLE, WASHINGTON.

ELECTRIC HEATING DEVICE.

Application filed May 31, 1922. Serial No. 564,727.

*To all whom it may concern:*

Be it known that I, LESLIE M. ADAMS, a citizen of the United States, residing at Seattle, in the county of King and State of Washington, have invented certain new and useful Improvements in Electric Heating Devices, of which the following is a specification, reference being had to the accompanying drawings.

This invention relates to improvements in fluid heaters, and more particularly to fluid heaters of the type where the heat is derived from electrical heating elements.

An important object of the invention is to provide a device of this character which may be employed for providing instantaneous hot water or other fluid.

A further object of the invention is to provide a device of this character which may be readily assembled, which is simple in its construction and arrangement, durable in service, and a general improvement in the art.

These and other objects I attain by the construction and arrangement shown in the accompanying drawings wherein for the purpose of illustration is shown a preferred embodiment of my invention and wherein like reference characters designate like parts.

In the drawings:—

Figure 1 is a vertical sectional view taken through a heater constructed in accordance with my invention; and Figure 2 is a section on the line 2—2 of Figure 1.

Referring more particularly to the drawings, I have shown the device as comprising a casing 10 preferably of somewhat frusto-conical shape and constructed of any desired material. Located within this casing are concentric units of the same general shape, indicated at 9, 8 and 7, each unit including an outer wall 11 formed with an outwardly pressed helical projection 12 which will operate to define passages 13 between the units. The units 9 and 8 further include an inner wall 6 which is not formed with any groove. The two walls of the units 9 and 8 are spaced apart and the space therebetween contains a heating coil 15 embedded within suitable insulating material such as sheets of mica or the like indicated at 16. The unit 9 is sealed with respect to the casing by any desired means such as that indicated at 14.

The upper and lower ends of the casing are continued above and below the ends of the shells, as indicated at 17 and 18 respectively, and at its lower end the casing has secured thereto a plate 19 upon which the shells rest. The ends 17 and 18 of the casing are engaged by suitable caps 20 and 21 closing the ends of the heater, the upper end being provided with a suitable electrical connection 22, the wires from which are connected to opposite ends of the heating coil 15. In order to provide for engagement of one of these wires, designated as 23 in the drawings, with the lower ends of the coils, the wire is directed downwardly through the center of the innermost shell and through a suitable opening 24 forming in the plate 19, again extending upwardly through suitable openings 25 to engage the terminals of the coil. The outer-most passage 13 of the heater is connected with a suitable inlet 26 at one end and at the opposite end, as indicated at 27, with the passage 13 of the next innermost pair of shells. The opposite end of the last named passage 13 is connected to one end of the innermost passage 13 of the heater, the opposite end of which is connected with an outlet pipe 28 extending downward through the central opening of the innermost shell and through the plate 19. This outlet pipe, if desired, may be suitably housed behind a false plate 29 secured upon the outer surface of the outermost shell.

From the foregoing it is believed to be obvious that a fluid heater constructed in accordance with my invention may be readily and cheaply manufactured, is very simply constructed and will be durable and efficient in service. It will furthermore be obvious that the construction as hereinbefore set forth is capable of some change and modification without materially departing from the spirit of my invention and I accordingly do not limit myself thereto except as hereinafter claimed.

I claim:—

1. In a device of the character described, a casing, a plurality of concentric uni located within the casing, the outermost units being double-walled and carrying heating coils located between the walls, each unit being formed with an outwardly pressed helical ridge bearing against the inner wall of the next successive unit whereby to define a series of helical passages between the units, an inlet leading into the lower portion of the casing at one side thereof at the lower end of the outermost helical passage, a passage through the outermost unit at the upper end thereof for establishing communication between the upper ends of the two outermost helical passages, a passage in the lower portion of the next successive unit establishing communication between the lower ends of the innermost and intermediate helical passages, and an outlet pipe located at substantially the center of the innermost unit and communicating with the upper end of the innermost helical passage.

2. In a device of the character described, a casing, a plurality of concentric units located within the casing, the outermost units being double-walled and carrying heating coils located between the walls, each unit being formed with an outwardly pressed helical ridge bearing against the inner wall of the next successive unit whereby to define a series of helical passages between the units, an inlet leading into the lower portion of the casing at one side thereof at the lower end of the outermost helical passage, a passage through the outermost unit at the upper end thereof for establishing communication between the upper ends of the two outermost helical passages, a passage in the lower portion of the next successive unit establishing communication between the lower ends of the innermost and intermediate helical passages, and an outlet pipe located at substantially the center of the innermost unit and communicating with the upper end of the innermost helical passage, a partition plate within the lower end of the casing supporting all of said units, a cap closing the lower end of the casing and co-operating with said partition plate to define a compartment, said heating coils having their current carrying wires located within said compartment, said outlet pipe having a horizontal extension at its lower end arranged within said compartment, said casing having an extension at one side thereof, and said outlet pipe having an upward extension housed within said casing extension and projecting therethrough.

In testimony whereof I hereunto affix my signature.

LESLIE M. ADAMS.